(12) United States Patent
Schwery et al.

(10) Patent No.: US 8,878,403 B2
(45) Date of Patent: Nov. 4, 2014

(54) AIR-COOLED MOTOR-GENERATOR AND METHOD FOR OPERATING A MOTOR-GENERATOR

(75) Inventors: Alexander Schwery, Küttigen (CH); Stefan Baumeister, Rheinheim (DE); Benjamin Jordan, Suhr (CH); Simon Andreas Frutiger, Lenzburg (CH)

(73) Assignee: Alstom Renewable Technologies, Grenoble (FR)

( * ) Notice: Subject to any disclaimer, the term of this patent is extended or adjusted under 35 U.S.C. 154(b) by 367 days.

(21) Appl. No.: 13/228,812

(22) Filed: Sep. 9, 2011

(65) Prior Publication Data
US 2012/0068561 A1 Mar. 22, 2012

(30) Foreign Application Priority Data

Sep. 21, 2010 (CH) ....................................... 1525/10
Oct. 23, 2010 (DE) .......................... 10 2010 049 417

(51) Int. Cl.
*H02K 9/12* (2006.01)
*F28F 27/02* (2006.01)
*F28D 21/00* (2006.01)

(52) U.S. Cl.
CPC . *H02K 9/12* (2013.01); *F28F 27/02* (2013.01); *F28D 2021/0028* (2013.01)
USPC ......................................................... 310/53

(58) Field of Classification Search
None
See application file for complete search history.

(56) References Cited

U.S. PATENT DOCUMENTS

| 4,845,394 | A  | * | 7/1989 | Kleinhans ...................... 310/64 |
| 5,664,542 | A  | * | 9/1997 | Kanazawa et al. ............ 123/361 |
| 7,619,332 | B2 | * | 11/2009 | Kimura et al. .................. 310/58 |
| 8,392,097 | B2 | * | 3/2013 | Ma et al. ....................... 701/113 |
| 2006/0071568 | A1 | * | 4/2006 | Kimura et al. ............ 310/156.56 |
| 2006/0290214 | A1 | * | 12/2006 | Diestel-Feddersen et al. . 310/68 D |

FOREIGN PATENT DOCUMENTS

| EP | 0299908 | 1/1989 |
| EP | 0740402 | 10/1996 |
| JP | 59-157491 | 9/1984 |
| JP | 2008-67471 | 3/2008 |

OTHER PUBLICATIONS

Search Report for Swiss Patent App. No. 01525/2010 (May 25, 2011).

* cited by examiner

*Primary Examiner* — Tran Nguyen
(74) *Attorney, Agent, or Firm* — Buchanan Ingersoll & Rooney PC

(57) ABSTRACT

An air-cooled motor-generator (10) includes a rotor (34) with a rotor shaft (11), which is arranged rotatably about a machine axis (15) and on which a rotor winding (16) is arranged, and a stator (35) with a stator laminate stack (18) and a stator winding (17) arranged therein, which concentrically surrounds the rotor winding (16) A closed cooling circuit operating with cooling air (24) is provided, with the cooling air in the cooling circuit flowing through the rotor winding (16) and the stator winding (17) radially from the inside outwards, the cooling air being cooled in coolers (19) arranged outside the stator (35) and being fed back to the rotor (34). Cooling which can be changed before or during operation is achieved in a simple manner by virtue of the fact that adjustable throttle devices are provided for adjusting the volume flow of the cooling air in the cooling circuit at the coolers (19).

14 Claims, 3 Drawing Sheets

AIR-COOLED MOTOR-GENERATOR AND METHOD FOR OPERATING A MOTOR-GENERATOR

This application claims priority under 35 U.S.C. §119 to Swiss App. No. 01525/10, filed 21 Sep. 2010, and to German App. No. 10 2010 049 417.8, filed 23 Oct. 2010, the entireties of which are incorporated by reference herein.

BACKGROUND

1. Field of Endeavor

The present invention relates to the field of rotating electrical machines. It relates to an air-cooled motor-generator as well as to a method for the operation thereof.

2. Brief Description of the Related Art

Air-cooled motor-generators are generally cooled via a closed air circuit. The required quantity of air is determined by the losses to be dissipated. Since both the losses which occur and also the generated cooling air volume flow cannot be determined precisely in advance, it is necessary to include reserves with respect to the volume flow in the planning. An excessively low quantity of air results in overheating of the generator. An excessively high volume flow results in unnecessary losses with respect to the ventilation. The aim is therefore to select the cooling air volume flow to be as high as is necessary but also as low as possible. In general, the volume flow is limited by artificially generated pressure drops within the air circuit (throttle principle).

Devices and methods embodying principles of the present invention can simplify and optimize this procedure. The aim is to match the cooling air volume flow to the requirements for cooling as precisely as possible, whether this be once, when generators are first brought into operation, or more often, in the case of different load cases of the generator, such as arise in the case of asynchronous machines. Conventionally, this is brought about, for example, by constricting specific cross sections within the air path in the case of water-powered machines, as are disclosed, for example, in FIG. 1 of document EP 740 402 A1. In the case of large water-powered machines, this often takes place at the inlet to the rotor spider. By virtue of additional laminations, the inlet cross section is constricted and therefore the quantity of cooling air is limited.

However, this procedure has a few disadvantages:

- It is no longer possible for the covering laminations to be mounted on the rotor spider, depending on the construction of the machine with the installed rotor. The opening area at the inlet to the rotor spider therefore needs to be fixedly defined even before the rotor is installed.
- If the introduction of additional laminations is possible with the rotor installed, this can also only take place when the machine is at a standstill. This is time consuming and, nevertheless, the volume flow cannot be influenced precisely.
- The covering laminations increase the weight with which the bearings are loaded. Furthermore, the laminations need to be fixed correspondingly carefully since they are located on the rotating part of the generator.
- The volume flow distribution, which is decisive for the uniformity of the cooling and therefore the temperatures in the machine, can be negatively influenced.
- It is not possible to respond to different load cases of the generator.

SUMMARY

One of numerous aspects of the present invention includes a motor-generator which, with respect to the cooling, can avoid the disadvantages of the conventional solutions and, in particular, makes it possible to perform throttling during running operation or to match the volume flow of the cooling air precisely to the respective requirements, and to do this in particular also dynamically with different loads. In this case, the bearings of the machine should not be subjected to any additional load. Another aspect includes a method for operating such a motor-generator.

Another aspect includes an air-cooled motor-generator which includes a rotor with a rotor shaft, which is arranged rotatably about a machine axis and on which a rotor winding is arranged, and a stator with a stator laminate stack and a stator winding arranged therein, which concentrically surrounds the rotor winding, a closed cooling circuit operating with cooling air being provided, with the cooling air in said cooling circuit flowing through the rotor winding and the stator winding radially from the inside outwards, said cooling air being cooled in coolers arranged outside the stator and being fed back to the rotor. Another aspect includes that the motor-generator is provided with adjustable throttle devices for adjusting the volume flow of the cooling air in the cooling circuit at the coolers.

Another aspect of the present invention includes that it enables throttling during running operation. Therefore, the volume flow can be matched precisely to the respective requirements. If required, this is also possible dynamically with different loads. The additionally required component parts are not located in the rotating part of the generator and therefore do not unnecessarily load the bearings. Throttling is performed virtually at the "end" of the cooling circuit, i.e., upstream or downstream of the coolers.

In accordance with one configuration, the throttle devices are arranged on the inlet side of the coolers.

In accordance with another configuration, the throttle devices are arranged on the outlet side of the coolers.

Another configuration is characterized by the throttle devices including a plurality of laminations, which laminations are arranged parallel to one another in a plane perpendicular to the direction of flow.

In accordance with a development of this configuration, the laminations are each designed to be capable of pivoting about their longitudinal axis.

In an expedient development, the laminations are individually pivotable. This makes it possible to influence the volume flow not only as a whole but also in terms of the distribution over the cross-sectional area.

A further configuration is characterized by the laminations extending over the entire width and/or the entire height of the coolers.

Another configuration is characterized by the throttle devices having a large number of throttle elements arranged distributed in a plane perpendicular to the direction of flow, wherein each of the throttle elements comprises a through-opening.

In accordance with a preferred embodiment, a throttle valve, which can pivot about an axis of rotation, is arranged at least in some of the through-openings in the manner of a flap valve.

In this case, too, the throttle elements can be capable of being actuated individually.

A method for operating a motor-generator is characterized by the volume flow of the cooling air being adjusted during running operation of the motor-generator by continuous adjustment of the throttle devices.

In accordance with a configuration, the volume flow is adjusted by the throttle devices depending on a temperature measured at the motor-generator.

Another configuration is characterized by the volume flow being adjusted once when the motor-generator is first used.

Yet another configuration is characterized by the volume flow being dynamically regulated during operation of the motor-generator depending on the load case.

BRIEF DESCRIPTION OF THE DRAWINGS

The invention will be explained in more detail below with reference to exemplary embodiments in connection with the drawings, in which.

DETAILED DESCRIPTION OF EXEMPLARY EMBODIMENTS

Figure 1:
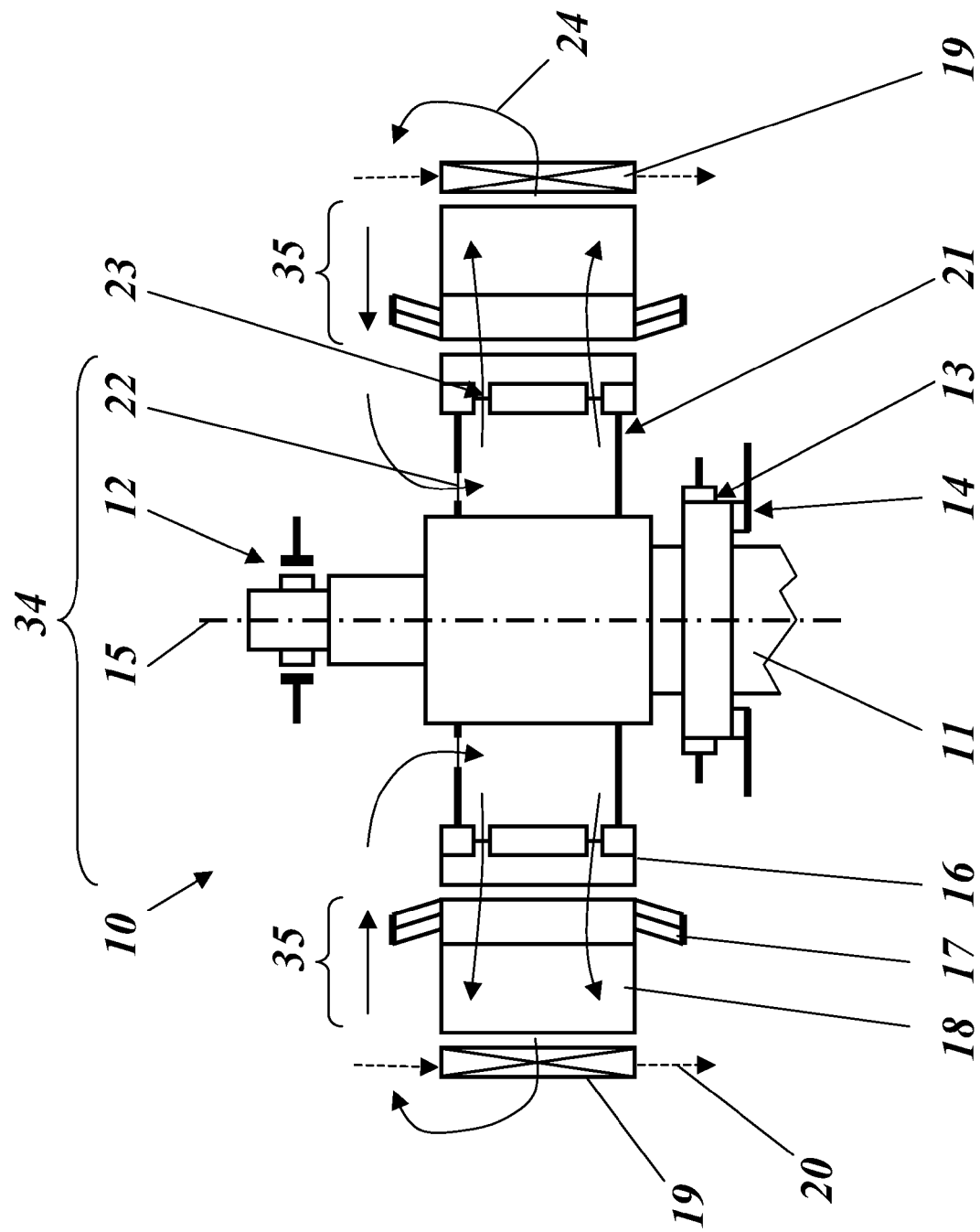
FIG. 1 shows a schematic design of a vertical-axis motor-generator with air cooling, as is suitable for implementation with devices embodying principles of the present invention.

FIG. 1 shows the schematic design of a vertical-axis motor-generator with air cooling, as is suitable for implementing aspects of the invention. The motor-generator 10 includes a rotor 34, which is arranged rotatably about a machine axis 15 and has a rotor shaft or hub 11, on which a rotor winding 16 is provided in the form of pole windings arranged in distributed fashion. The rotor winding 16 is connected to the rotor shaft 11 via a rotor spider 21.

The rotor shaft 11 is mounted rotatably with the aid of radial bearings 12, 13 and axial bearings 14. The rotor spider 21 is designed to guide cooling air 24 which enters through inlet openings 22 and passes to the outside by corresponding through-channels 23 in the rotor winding 16 in the radial direction through the rotor winding 16. The rotor winding 16 is concentrically surrounded by a stator 35, which has a stator winding 17 mounted in a stator laminate stack 18. The cooling air emerging from the rotor winding 16 flows through the stator 35 in the radial direction and, once it has emerged from the stator 35, is cooled by externally arranged coolers 19, through which water 20 flows (see the indicated pipelines 27 in FIG. 2 or 3). The cooling air 24 which is cooled down in the coolers 19 is fed back to the rotor 34 and enters the rotor spider 21 again so as to close the cooling circuit.

Figure 2:
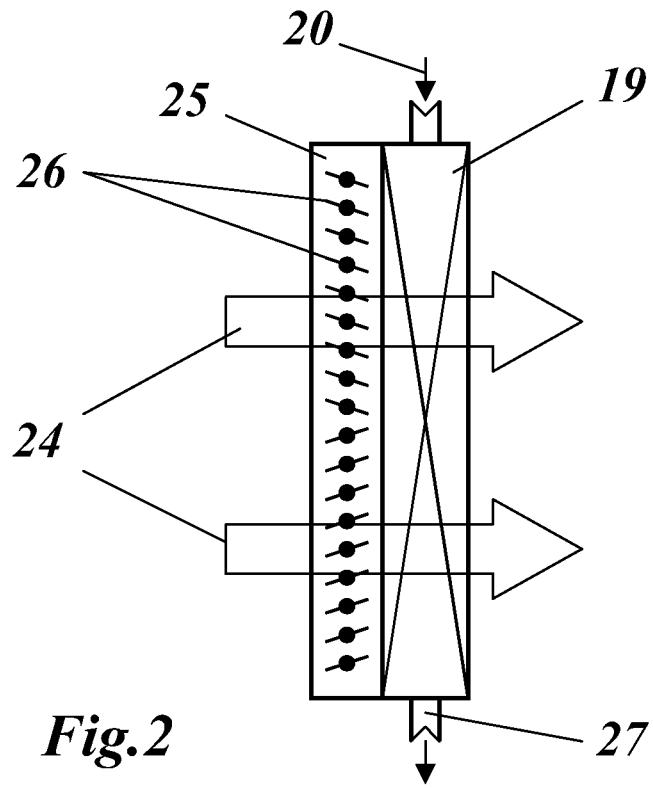
FIG. 2 shows the arrangement of an adjustable throttle device on the inlet side of the cooler in accordance with an exemplary embodiment of the invention.
Figure 3:
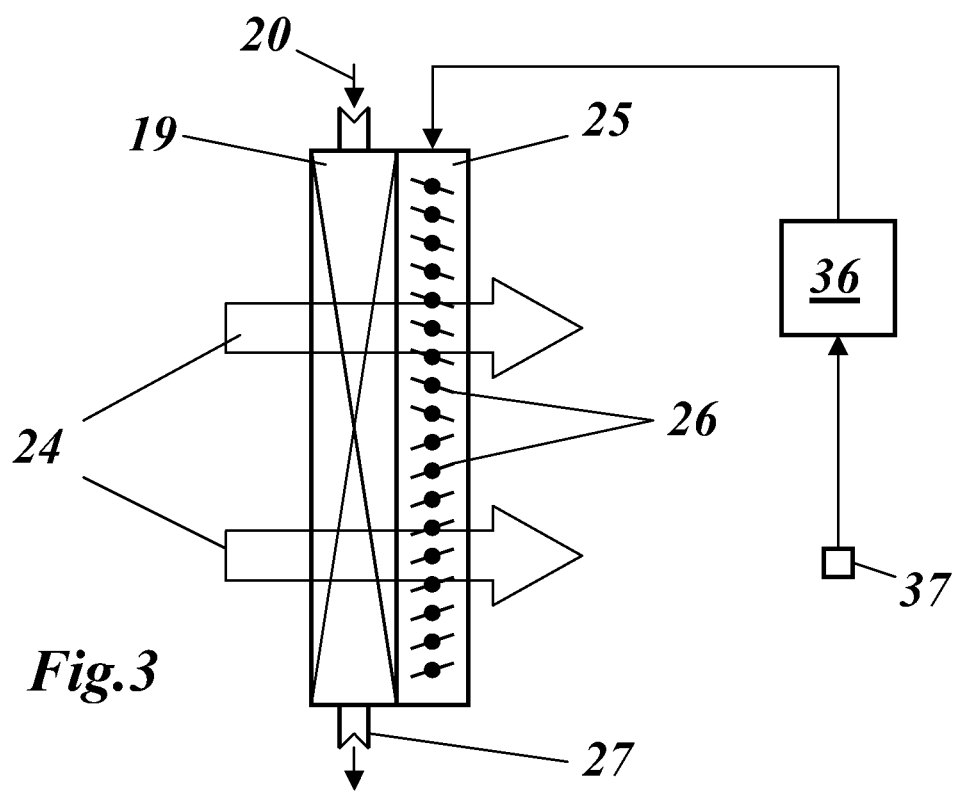
FIG. 3 shows the arrangement of an adjustable throttle device (with controller) on the outlet side of the cooler in accordance with another exemplary embodiment of the invention.

The throttling of the cooling air volume flow is now performed as the cooling air enters the coolers 19 or as it emerges from the coolers 19, as is illustrated by way of example in FIG. 2 and FIG. 3. In FIG. 2, a throttle device 25 is arranged on the inlet side of the coolers 19, said throttle device having a plurality of laminations 26 which can be pivoted about the longitudinal axis (in FIG. 2, the longitudinal axes of the laminations 26 are oriented perpendicular to the plane of the drawing). In principle, the laminations 26 can be pivoted jointly by a mechanism (not illustrated) in order to effect adjustable throttling of the volume flow of the cooling air 24 through the cooler 19 or in the cooling circuit. However, it is also conceivable for the laminations 26 to be designed to be individually pivotable in order to be able to thus influence the volume flow differently at different points of the cross-sectional area.

The same throttle device 25 can also be arranged on the outlet side of the cooler 19, however, as is shown in FIG. 3. In both cases, sufficient space is available at the cooler 19 for the throttle devices 25. Furthermore, this region is easily accessible from the outside and is therefore well suited in respect of installation and maintenance.

The pressure loss coefficient and therefore the pressure drop can be influenced in a simple manner by virtue of the position of the laminations 26 in the lamination grid. The laminations 26 can in this case extend over the entire cooler width and/or height, depending on the design.

Figure 4:
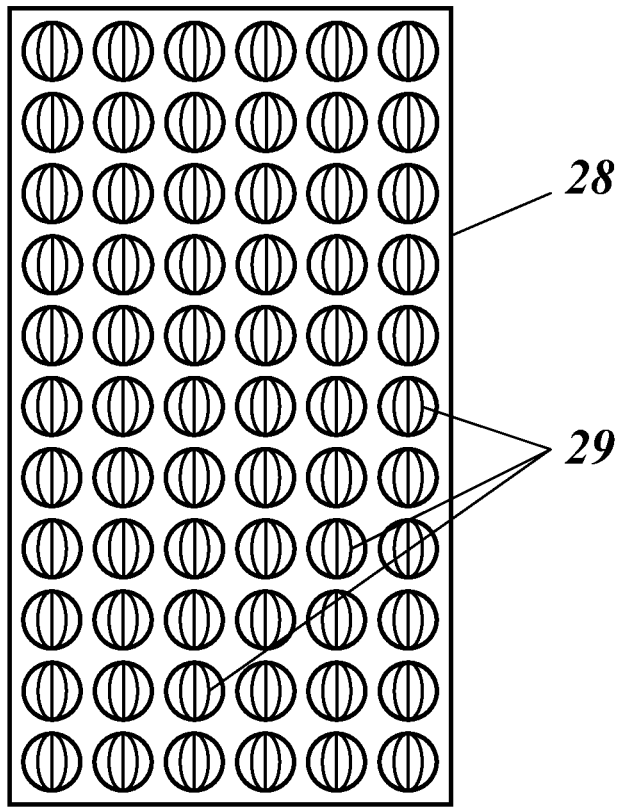
FIG. 4 shows a plan view, in the direction of flow, of a further type of throttle device.
Figure 5:
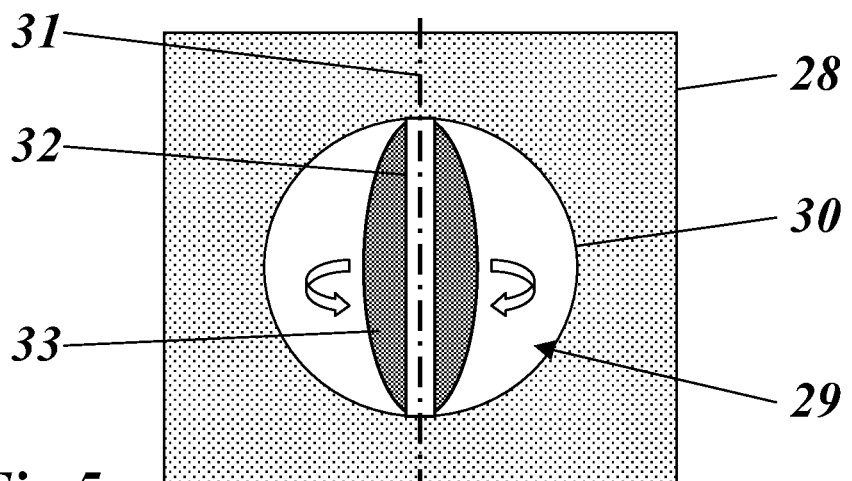
FIG. 5 shows the design of an individual throttle element of the throttle device shown in FIG. 4.

The design and mode of operation of the throttle devices can vary depending on requirements: a different type of throttle device is shown in FIGS. 4 and 5. The throttle device 28 from FIG. 4 includes a large number of individual throttle elements 29, which are arranged so as to be uniformly distributed in an otherwise impermeable wall. The individual throttle element 29 has (FIG. 5) a through-opening 30 (which is circular in the example), in which a throttle valve 33 is arranged such that it can pivot about an axis of rotation 31 by a valve spindle 32 in the manner of a flap valve. Depending on the pivoting position of the throttle valve 33, the through-opening 30 is open to a greater or lesser extent. The pressure loss coefficient and therefore the pressure drop can be influenced via the position of the throttle valve 33. The individual "throttles" or throttle elements 29 can be combined as required.

The object of the throttle devices is always to influence the pressure drop and therefore the volume flow. The volume flow is adjusted continuously during running operation of the installation. The optimum volume flow is adjusted via the temperature monitoring of the generator. For this purpose, a throttle controller 36 can be provided (as illustrated in very simplified form in FIG. 3), which obtains temperature information from a temperature pickup 37 and then controls the throttling in the throttle device 25. As already mentioned, this can be performed once when the installation is first brought into operation or, if required, the volume flow can also be regulated dynamically depending on the load case. In the former case, it may be advantageous for at least some of the throttle elements 29 to be implemented as fixed diaphragms in the interests of decreasing the complexity of the apparatus. By virtue of the fact that these can be designed differently in terms of cross-sectional shape and/or area, the pressure loss and therefore the distribution of the cooling air flow over the cross section can be influenced. The throttle devices 25 or 28 can be manufactured simply and robustly since there are no particular requirements as regards tolerances.

LIST OF REFERENCE SYMBOLS

10 Motor-generator (air-cooled)
11 Rotor shaft
12, 13 Radial bearings
14 Axial bearing
15 Machine axis
16 Rotor winding
17 Stator winding
18 Stator laminate stack
19 Cooler
20 Water
21 Rotor spider
22 Inlet opening
23 Through-channel 24 Cooling air
25, 28 Throttle device
26 Lamination (pivotable)
27 Pipeline
29 Throttle element
30 Through-opening
31 Axis of rotation
32 Valve spindle
33 Throttle valve
34 Rotor
35 Stator
36 Throttle controller
37 Temperature pickup While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

We claim:

1. An air-cooled motor-generator comprising:
 a rotor with a rotor shaft arranged rotatably about a machine axis and including a rotor winding arranged on the rotor shaft;
 a stator having a stator laminate stack and a stator winding arranged in the stator laminate stack, the stator concentrically surrounding the rotor winding;
 a closed cooling circuit configured and arranged for operation with cooling air, such that cooling air in said cooling circuit flows through the rotor winding and the stator winding radially from the inside outwards;
 coolers arranged outside the stator configured and arranged to cool the cooling air and feed back cooled cooling air to the rotor; and
 adjustable throttle devices configured and arranged to adjust a volume flow of the cooling air in the cooling circuit at the coolers,
 wherein the throttle devices comprise a plurality of throttle elements arranged distributed in a plane perpendicular to the direction of flow of cooling air through the devices, with each of the throttle elements comprising a through-opening and a throttle valve which can pivot about an axis of rotation, the throttle valve being arranged as a flap valve.

2. The motor-generator as claimed in claim 1, wherein the throttle devices are arranged on an inlet side of the coolers.

3. The motor-generator as claimed in claim 1, wherein the throttle devices are arranged on an outlet side of the coolers.

4. The motor-generator as claimed in claim 1, wherein the throttle devices comprise a plurality of laminations.

5. The motor-generator as claimed in claim 4, wherein at least some of the laminations are arranged parallel to one another in a plane perpendicular to a direction of flow of cooling air through the laminations, and are pivotable about a longitudinal axis.

6. The motor-generator as claimed in claim 5, wherein the laminations are individually pivotable.

7. The motor-generator as claimed in claim 4, wherein the laminations extend over the entire width of the coolers, over the entire height of the coolers, or over both.

8. The motor-generator as claimed in claim 1, wherein the through-openings each have the same cross-sectional shape, area, or both.

9. The motor-generator as claimed in claim 1, wherein the through-openings each have a different cross-sectional shape, area, or both.

10. The motor-generator as claimed in claim 1, wherein the plurality of throttle elements are configured and arranged to be actuated individually.

11. A method for operating a motor-generator, the method comprising: providing a motor-generator as claimed in claim 1; and adjusting the volume flow of cooling air during running operation of the motor-generator by continuous adjustment of the throttle devices.

12. The method as claimed in claim 11, wherein adjusting comprises adjusting the volume flow depending on a temperature measured at the motor-generator.

13. The method as claimed in claim 11, wherein adjusting comprises adjusting the volume flow once when the motor-generator is first used.

14. The method as claimed in claim 11, wherein adjusting the volume flow comprises dynamically regulating the volume flow during operation of the motor-generator depending on the load.

* * * * *